United States Patent [19]

Whitney, Jr.

[11] Patent Number: 5,365,664
[45] Date of Patent: Nov. 22, 1994

[54] METHOD OF MAKING ALUMINUM ALLOY BEARING

[75] Inventor: Warren J. Whitney, Jr., Ypsilanti, Mich.

[73] Assignee: Federal-Mogul Corporation, Southfield, Mich.

[21] Appl. No.: 81,780

[22] Filed: Jun. 22, 1993

[51] Int. Cl.⁵ ............................................. B23P 15/00
[52] U.S. Cl. ............................. 29/898.12; 29/898.13; 29/527.7
[58] Field of Search ............... 29/898, 898.12, 898.13, 29/898.7, 527.1, 527.7, 527.6, 527.5; 164/428, 480; 428/653

[56] References Cited

U.S. PATENT DOCUMENTS

| | | | |
|---|---|---|---|
| 2,790,216 | 4/1957 | Hunter | 164/480 |
| 2,850,776 | 9/1958 | Hunter | 164/480 |
| 3,078,563 | 2/1963 | Gould et al. | |
| 3,386,161 | 6/1968 | Ruf | 29/898.12 |
| 3,562,884 | 2/1971 | Webbere | 29/898.12 |
| 3,809,551 | 5/1974 | Morisaki | 75/140 |
| 4,069,369 | 1/1978 | Fedor et al. | 428/557 |
| 4,278,740 | 7/1981 | Nara et al. | 428/653 |
| 4,296,183 | 10/1981 | Iwanhana et al. | 428/653 |
| 4,340,649 | 7/1982 | Nara et al. | 428/653 |
| 4,452,866 | 6/1984 | Kamiya et al. | 428/653 |
| 4,471,029 | 9/1984 | Fukuoka et al. | 428/653 |
| 4,471,030 | 9/1984 | Fukuoka et al. | 428/653 |
| 4,471,031 | 9/1984 | Fukuoka et al. | 428/653 |
| 4,471,032 | 9/1984 | Fukuoka et al. | 428/653 |
| 4,471,033 | 9/1984 | Fukuoka et al. | 428/653 |
| 4,617,172 | 10/1986 | Mori | 420/530 |
| 4,738,011 | 4/1988 | Mori | 29/898.12 |
| 4,789,607 | 12/1988 | Fujita et al. | 428/653 |
| 4,806,308 | 2/1989 | Kamiya et al. | 420/530 |
| 4,818,487 | 4/1989 | Kamiya et al. | 420/530 |
| 4,822,561 | 4/1989 | Kamiya et al. | 430/530 |
| 4,857,267 | 8/1989 | Maki et al. | 419/31 |
| 4,996,025 | 2/1991 | Pratt et al. | 420/554 |
| 5,053,286 | 10/1991 | Pratt et al. | 428/653 |

FOREIGN PATENT DOCUMENTS 2185041  7/1987  United Kingdom .

Primary Examiner—Irene Cuda
Attorney, Agent, or Firm—Lawrence J. Shurupoff

[57] ABSTRACT

A shaft bearing is formed from an aluminum alloy that has approximately 8% Sn, 4% Si, 2% Pb and 1% Cu on a weight percentage basis. The tin has an average particle size less than five microns and the silicon has an average particle size less than 3.5 microns. The alloy is formed into a continuous solid strip by a quench casting operation, wherein molten alloy is fed into an interface between two internally-cooled rolls to freeze the alloy into a solid strip condition in less than one second. The aluminum alloy strip is pressure bonded to a steel backing strip to form a composite strip useful in forming a shaft bearing. During the pressure bonding step the thickness of the aluminum alloy strip is significantly reduced while the thickness of the steel strip remains essentially unchanged.

5 Claims, 2 Drawing Sheets

FIG 4
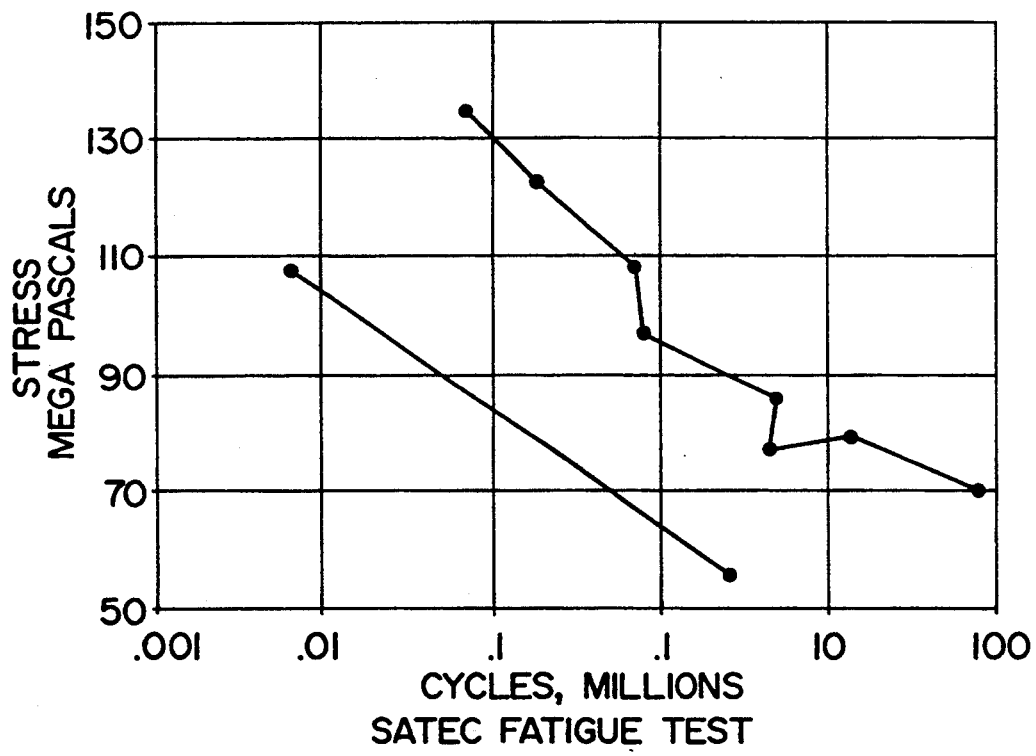
CYCLES, MILLIONS
SATEC FATIGUE TEST
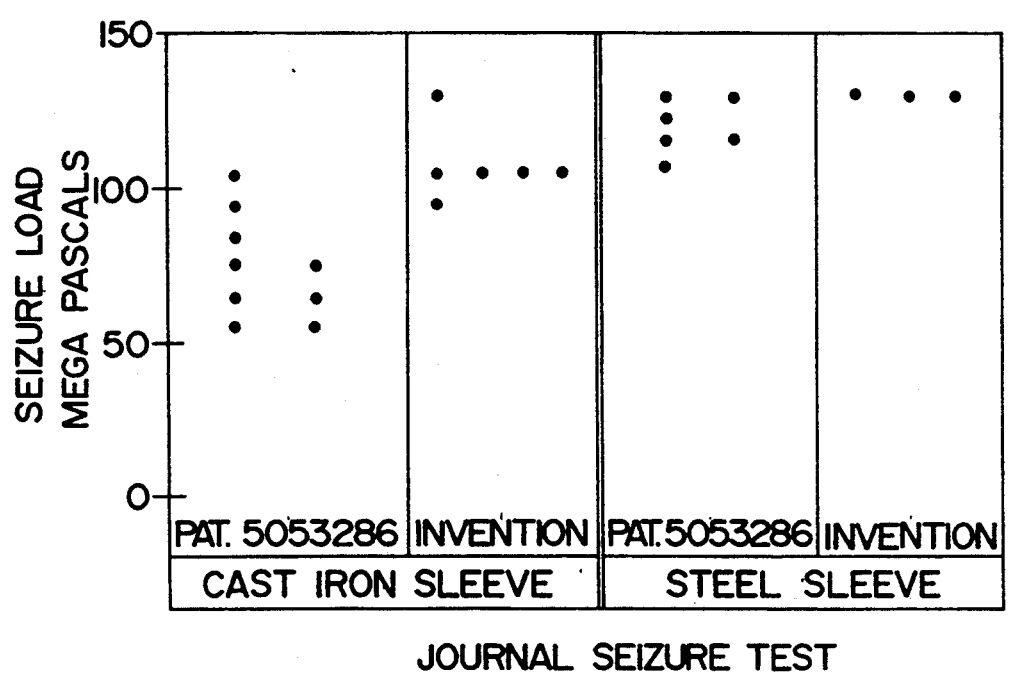
JOURNAL SEIZURE TEST
FIG 5

METHOD OF MAKING ALUMINUM ALLOY BEARING

BACKGROUND OF THE INVENTION

1. Field of the Invention

The present invention relates to a bearing that includes a steel backing and an aluminum alloy lining containing minor amounts of tin, silicon, lead and copper. The invention also relates to a method of manufacturing the alloy.

2. Description of Prior Developments

Bearings formed of aluminum alloys containing tin, silicon, lead and copper are known in the art. For example, U.S. Pat. No. 3,809,551 to Morisaki discloses an aluminum bearing alloy containing tin, lead, copper, and antimony. The antimony is used to ensure a uniform and fine dispersion of the lead in the aluminum. The lead has an affinity for oil so that a lubricant film can be maintained at the shaft-bearing interface even during start-up periods.

U.S. Pat. No. 4,471,029 to Fukuoka et al. discloses a bearing alloy comprising aluminum and minor amounts of tin and silicon. The silicon particles have nodular or rounded configurations. Additional elements such as lead, indium, cadmium and bismuth can be incorporated in the alloy to improve the wear resistance of the alloy. Silicon particles, in nodular form, improve the seizure resistance of the alloy.

U.S. Pat. No. 4,789,607 to Fujita et al. relates to an aluminum base alloy containing tin, silicon, lead, strontium and antimony. The strontium and antimony are said to facilitate precipitation of silicon particles in spherical form.

U.S. Pat. No. 4,822,561 granted to Kamiya discloses a bearing alloy comprising aluminum and minor amounts of tin and copper, together with either manganese or zirconium. Optionally, the alloy can include lead and silicon. The manganese or zirconium apparently increases the alloy hardness by controlling the grain size of the other alloying elements.

SUMMARY OF THE INVENTION

The present invention is directed to an aluminum alloy lining for a bearing, especially a bearing for the crankshaft of an internal combustion engine. The alloy preferably contains approximately 8% tin (Sn), 4% silicon (Si), 2% lead (Pb) and 1% copper (Cu) on a weight percentage basis. The aluminum alloy is in the shape of a strip formed by a quench casting process.

In a preferred practice of the invention, molten aluminum alloy is fed into an interface formed between two internally-cooled rotating metallic rolls such that the alloy is rapidly cooled from the molten state to a solid state in less than one second. The solid material emerges from the rolls as a continuous solid strip. The quench casting process freezes the alloy elements in the liquidus condition such that the copper is in solid solution with aluminum and at least some of the tin and lead are in solid solution with each other.

The aluminum alloy strip is pressure bonded to a steel backing strip by passing two mating strips of aluminum alloy and steel through a rotating roll assembly such that the aluminum strip is subjected to a relatively high pressure sufficient to bond the two strips together. The roll in contact with the aluminum alloy strip has a diameter significantly smaller than the diameter of the roll in contact with the steel strip so that, during the rolling operation, the thickness of the aluminum alloy strip is measurably reduced while the thickness of the steel strip remains essentially unchanged.

Prior to passage through the roll assembly, the mating strips are preheated to a temperature in the range of 600° F. to 750° F. In a modified process, only the steel strip is passed through a furnace and subsequently roll bonded to an aluminum strip held at room temperature.

The tin particles preferably have an average particle size of less than five microns. The silicon particles preferably have an average particle size of less than 3.5 microns, and even more preferably of less than 2.5 microns.

Tin is included in the alloy in order to improve shaft seizure resistance and to provide lubricity and conformability to surface characteristics of the rotating shaft. Silicon is included to improve the wear resistance of the bearing. When the shaft is formed of nodular cast iron, the relatively hard silicon particles exert a polishing action on the rough shaft surface thereby removing minor roughness that could otherwise produce premature bearing wear.

Silicon is also advantageous in that, during the process of pressure bonding the aluminum alloy strip to the steel backing strip, the silicon particles prevent or minimize the potential formation of a brittle iron-aluminum alloy that can decrease the alloy-to-steel bond strength and adversely affect the workability characteristics of the composite alloy-steel strip.

Lead is included as an alloying element because of its affinity for oil and its ability to absorb foreign particles. This ability is sometimes referred to as embedability. Copper is included in the alloy because it acts as a hardener, i.e. it improves fatigue resistance and the high temperature strength of the aluminum alloy.

The aluminum alloy strip is preferably formed by a quench casting process such that the copper remains in solid solution with the aluminum and at least some of the tin remains in solution with the lead.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 4 is a graph depicting performance of an alloy of the present invention when subjected to a fatigue test.

FIG. 5 is a graph depicting performance of an alloy of the present invention subjected to a journal seizure test.

In the various figures of the drawings, like reference characters designate like parts.

DETAILED DESCRIPTION OF THE PREFERRED EMBODIMENTS

The present invention relates to a bearing formed primarily out of aluminum. A principal use of the bearing is in internal combustion engines for supporting an engine crankshaft. Aluminum is advantageous in such an environment because of its corrosion resistance, load-carrying ability, fatigue resistance and thermal conductivity. Certain alloying elements are added to the aluminum to enhance particular capabilities of the pure metal.

A preferred as-cast aluminum alloy contains approximately 8% Sn, 4% Si, 2% Pb and 1% Cu on a weight percentage basis. The tin preferably has an average particle size less than five microns in the as-cast alloy strip. The silicon has an average particle size less than 2.5 microns in the as-cast alloy strip. The Si particles are found in a very fine intergranular network. The alloy is prepared by heating the aluminum and alloying elements to a temperature slightly above the melting point of the pure aluminum, which is 1215° F. The melting points for the various alloying elements are, respectively, 449° F. for Sn, 2600° F. for Si, 621° F. for Pb and 1981° F. for Cu.

A feature of the invention is that the molten aluminum alloy is quench cast into the shape of a solid continuous strip, such that the copper-aluminum particles and the tin-lead particles are frozen in their combined states rather than being precipitated in elemental form.

Figure 1:
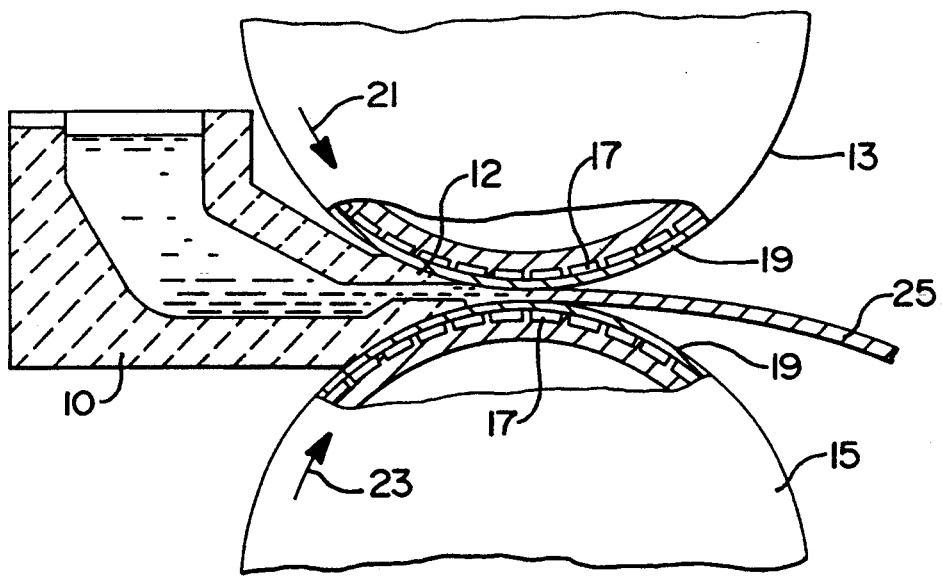
FIG. 1 is a fragmentary view of a quench casting apparatus that can be used in practice of the invention.

U.S. Pat. No. 5,053,286 to Pratt et al. discloses an apparatus than can be used to achieve the desired quench cast process. Attached FIG. 1 is a general representation of the apparatus more particularly described in U.S. Pat. No. 5,053,286. As shown in FIG. 1, molten aluminum alloy containing Sn, Si, Pb and Cu is supplied to a crucible 10 that has a slit-like discharge nozzle 12 located between two rotating rolls 13 and 15; the thickness dimension of the nozzle slit may be about four millimeters. Each rotating roll has an array of internal coolant channels or passages 17 located in close proximity to a relatively thin metal skin 19.

Each skin 19 is preferably formed of copper or other metal having a high thermal conductivity, whereby the-skin material is enabled to rapidly transmit heat from the molten aluminum alloy to the coolant passing through channels 17. The aluminum alloy is thereby rapidly cooled from the molten state to the solid state in a relatively short time period, i.e. less than one second. Cold water can be used as the coolant.

The internally cooled rolls 13 and 15 are continuously driven in the directions indicated by numerals 21 and 23 such that freshly-cooled roll surfaces are being continuously presented to the molten material as it is discharged through the slit-like discharge nozzle 12. The molten aluminum alloy is continuously replenished in crucible 10 to maintain an essentially constant hydrostatic head on the molten material being discharged through the nozzle slit 12. The cooled and solidified alloy emerges from the rolls as a continuous solid strip 25 having a thickness dimension corresponding to the spacing between the opposed roll surfaces. Strip 25 can be wound on a spool (not shown) for temporary storage in coil form.

The quench cast apparatus is further described in aforementioned U.S. Pat. No. 5,053,286. U.S. Pat. Nos. 2,790,216, 4,484,614 and 4,996,025 illustrate additional forms that the quench cast apparatus can possibly take.

The preferred apparatus includes a slit-like nozzle adapted to feed molten aluminum alloy into an interface formed between two internally-cooled rotating rolls so that the alloy is rapidly cooled to a solid state in less than one second, preferably only about 0.5 second. The solidifying alloy emerges from the rolls as a continuous solid strip.

The quench cast operation freezes and preserves the lead particles formed while the alloy is in the molten state. Also, the quench cast operation minimizes gravitational migration of the relatively heavy lead particles from the upper zone of strip 25 into the lower zone of the strip. The quench cast strip 25 has a reasonably uniform and fine dispersion of the Sn particles and Sn-Pb particles.

Prior to bonding to a steel backing strip, the as-cast alloy is heat treated and rolled to a thickness suitable for bonding, i.e. 1 mm to 2 mm. Heat treatment may be carried out above 350° C. for at least one hour to reduce the hardness of the alloy so as to promote its ability to bond to the steel backing.

Figure 2:
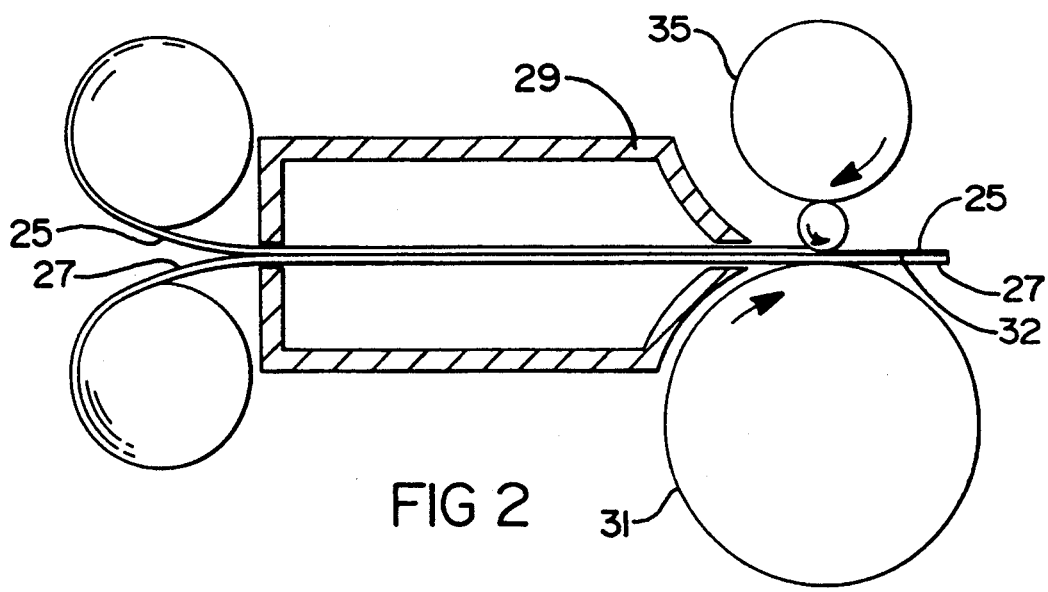
FIG. 2 is a diagrammatic view of an apparatus that can be used to pressure bond an aluminum alloy strip to a mating steel strip in the practice of the invention.

The rolled and heat treated strip 25 is pressure bonded to a steel strip by the apparatus shown schematically in FIG. 2. As shown in attached FIG. 2, the quench cast aluminum alloy strip 25 is mated to a steel strip 27 and then passed through a furnace 29. The mating strips are heated by the furnace to a temperature in the range of 600° F. to 700° F. The furnace atmosphere is a reducing, non-oxidizing atmosphere to protect the steel strip from undesired surface oxidation while it is in the heated condition. It is possible to heat only the steel strip and to join the heated steel strip with an aluminum strip which is maintained at room temperature prior to roll bonding to the steel strip.

The heated strips 25 and 27 are passed through a steel roll assembly that includes a relatively large diameter lower roll 31 and a relatively small diameter roll 33. The small diameter roll is reinforced or backed-up by a larger idler roll 35 such that roll 33 is enabled to exert a substantial unit area force on the aluminum alloy strip 25 without bending or deforming. The spacing between rolls 31 and 33 is less than the combined initial thickness of strips 25 and 27 such that the aluminum alloy strip is compressed and appreciably reduced in thickness during passage of the mating strips 25 and 27 through the rolls. Lower roll 31 is powered to provide the force for moving the mated strips through the space between rolls 31 and 33.

The diameter of roll 31 is preferably at least two times the diameter of roll 33 so that roll 33 exerts a substantially greater unit area force on the aluminum alloy roll than the unit area force exerted by roll 31 on the steel strip 27. The aluminum alloy strip is substantially reduced in thickness while the thickness of the steel strip remains essentially unchanged during passage of the mated strips through the space formed between rolls 31 and 33.

The hardness of the steel strip is not significantly increased by the rolling operation so that the emerging composite strip 32 (FIG. 2) is workable and reshapable into desired bearing configurations. Other alloys of this type are bonded by a process which significantly reduces the steel thickness, increasing its hardness and reducing its ductivity. It may not be possible to make flange bearings with the prior process. However, it is possible with this process.

Figure 3:
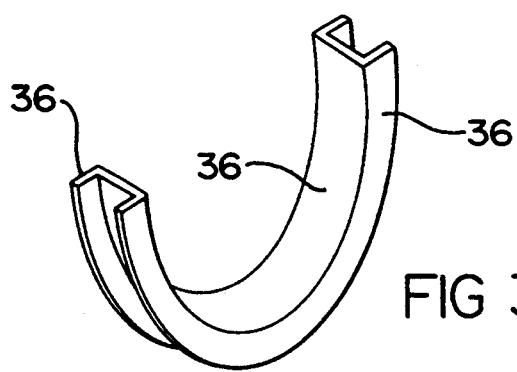
FIG. 3 is a perspective view of a crankshaft half bearing that can be formed from the composite alloy-steel strip produced by the FIG. 2 apparatus.

FIG. 3 shows a representative half bearing configuration used in an engine for rotatably supporting the engine crankshaft. In FIG. 3, the aluminum alloy surfaces are designated by numeral 36. A similar half bearing is mated to the FIG. 3 structure to form a complete bearing assembly encircling the shaft.

The pressure bonding operation is carried out without plating a protective layer or film on the steel surface in contact with the aluminum alloy surface. Under prior practice, a protective film of nickel, silver or copper on the steel surface was usually necessary to achieve a good bond between the steel and the aluminum alloy. In the present invention, a 4% silicon content, by weight, and an average silicon particle size less than 2.5 microns is believed to avoid the necessity for a protective film on the steel backing strip in order to achieve an alloy-steel strip bonding operation.

Silicon in finely divided form is believed to prevent the formation of a brittle iron-aluminum alloy film that is otherwise formed at the interface when it is attempted to directly bond aluminum to steel. The quench cast process tends to provide a reasonably even dispersion of the silicon particles in the cast alloy such that a protective dispersion of silicon is present at the steel-aluminum alloy interface during the pressure bonding operation.

Tin is included in the aluminum alloy in a concentration of 8% on a weight basis. The average particle size of the Sn is less than ten microns and preferably less than five microns. A low Sn particle size is desirable in that the alloy is thereby strengthened against fatigue. The Sn improves the shaft seizure resistance by providing lubricity and conformability. When the shaft is formed of nodular cast iron, the shaft surface may be relatively rough. The tin particles can conform to the rough shaft surface without tearing from the bearing surface.

Silicon is included because of its ability to prevent formation of a brittle aluminum-steel alloy during the pressure bonding operation. The silicon, in finely divided form, also contributes to the wear resistance of the bearing. The small, hard silicon particles exert a polishing action on rough shaft surfaces, thereby removing minor roughness that could produce premature bearing wear.

Lead is included as an alloying element because of its affinity for oil and its ability to absorb foreign particles, e.g., particles generated by the polishing action of the silicon or particles entrained in the lubricant film. During engine start-up, there may be an insufficient oil film at the shaft-bearing interface. The Pb will supply some lubrication until a satisfactory film can be established.

Copper is included in the alloy because it acts as an alloy hardener and because it contributes high temperature strength to the alloy.

The tin nominally has a weight concentration of 8%. However, the tin percentage can vary between 6% and 8.8% while still achieving a reasonably good end product. When the tin content is above 8.8%, it is difficult or impossible to cast the alloy by the disclosed high quench rate casting process. Tin in the specified range forms a solution with the lead and contributes to improved lubricity, conformability and shaft seizure resistance.

The lead nominally has a weight percentage of 2%. However, the lead concentration can be in the range from 1% to 2.5%. The upper limit on the lead concentration is dictated at least partly by the fact that, with higher concentrations, the lead does not dissolve in the aluminum at normal casting temperatures. The lower limit of 1% is needed for adequate shaft seizure resistance, lubricity and embedability.

The copper concentration can be in the range of 0.3% to 2%. Above 2% copper concentration, the alloy tends to be brittle and subject to shaft seizure, especially when the shaft is formed of nodular cast iron. The lower limit of 0.3% copper concentration is needed to provide adequate fatigue strength and hardness.

Silicon has a nominal concentration of 4%. However, the silicon concentration can be in the range of 3.5% to 5%. If the silicon concentration is higher than 5%, the bearing tends to be too hard for most intended applications. The alloy also becomes brittle and difficult to machine and the resistance to shaft seizure is reduced. When the silicon concentration is below 3.5%, the silicon does not adequately perform its function as a deterrent to seizure. Also, the wearability of the bearing surface suffers.

Aluminum alloys having the specific alloying elements and percentages herein disclosed are believed to be advantageous over the prior art in that the alloy can be directly bonded to the steel backing sheet without an interlayer of nickel or copper, as was often necessary under prior art practices. The improved bond between the aluminum and steel is achieved partly by the presence of the silicon in the 4% weight concentration and small average particle size. The lower tin concentration compared to other Al-Sn-Si alloys and small tin particle size is also a factor in that it permits the roll bonding operation to be carried out at a relatively high metal strip temperature in the range of 600° F. to 750° F. The higher temperatures, in conjunction with the roll pressure, result in good bonding between the aluminum alloy and the steel backing strip without the need for a bonding interlayer.

The bonding action achieved with prior art practices has been tenuous in nature, such that heat treatments or annealing were often required after the roll bonding operation in order to improve the strength of the aluminum-steel bond. Such annealing operations can adversely affect the physical characteristics of the aluminum alloy, i.e. decrease the hardness, decrease fatigue resistance and promote excessively large grain structure growth. Also, the copper and silicon can precipitate out of solution with the aluminum. The method and alloy percentages used in the present invention achieve a satisfactory bond between the alloy and the steel backing sheet such that subsequent annealing heat treatments are not required.

The alloy of the present invention provides a bearing surface having a desired combination of wear resistance, shaft-seizure resistance, lubricity, embedability and conformability. No overplating of the bearing surface with lead-based alloys is required. In many prior art bearings, the bearing surface must be overplated with a lead-based alloy, e.g., lead and tin, lead and copper or lead and indium. Such overplating is commonly used to protect against shaft seizure particularly when the shaft is formed of nodular cast iron. Bearings formed under the present invention provide reasonably good shaft seizure resistance without overplating the bearing surface.

Aforementioned U.S. Pat. No. 5,053,286 discloses a shaft bearing wherein the bearing material is an aluminum alloy containing, by weight, 0.5% tin, 4% silicon, 5% lead, 0.1% copper, 0.3% manganese and 0.1% magnesium. In comparative tests, aluminum alloy bearings having the composition of the present invention performed better than bearings having the composition disclosed in U.S. Pat. No. 5,053,286. Attached FIGS. 4 and 5 depict in graph form comparative results from fatigue, flexure tests and journal seizure tests. The upper plot in FIG. 4 represents the present invention and the two-point lower plot represents the prior art.

The bearing alloy and manufacturing process of the present invention is designed especially for use with engine crankshafts formed of nodular cast iron. The test result of FIG. 5 is indicative of expected superior performance from bearings constructed according to the present invention. Shaft seizure resistance is especially important in the engine crankshaft environment.

Obviously, numerous modifications and variations of the present invention are possible in the light of the above teachings. It is therefore to be understood that within the scope of the appended claims, the invention may be practiced otherwise than as specifically described herein.

What is claimed is:

1. A method of forming a bearing comprising an aluminum alloy lining bonded directly to a steel backing, comprising:
   quench casting the aluminum alloy lining by feeding molten alloy into an interface formed between two internally-cooled rotating metallic rolls so that the alloy is rapidly cooled from a molten state to a solid state in less than one second; said internally-cooled rolls having smooth facing surfaces spaced a slight distance apart so that the aluminum alloy emerges from the rolls as a continuous solid strip having a thickness dimension that corresponds to the spacing between the roll surfaces;
   providing a steel strip for forming said steel backing and mating said steel strip with said aluminum alloy strip; and
   passing the mating strips through a roll assembly wherein the opposed roll surfaces are spaced closer together than the combined thickness of the two strips, such that the aluminum alloy strip is compressed so as to be bonded directly to the steel strip, and wherein the roll in contact with the aluminum alloy strip has a diameter substantially smaller than the diameter of the other roll so that, during the rolling operation, the thickness of the aluminum alloy strip is significantly reduced while the thickness of the steel strip remains essentially unchanged.

2. The method of claim 1, further comprising preheating at least said steel strip prior to passing said strips through said opposed roll surfaces.

3. The method of claim 1, wherein said steel strip is preheated within a range of 600° F. to 750° F.

4. The method of claim 1, wherein said alloy comprises essentially by weight percentage approximately 8% Sn, 4% Si, 2% Pb, 1% Cu and the balance aluminum; the Sn having an average particle size less than ten microns and the Si having an average particle size less than 3.5 microns.

5. A method of forming a bearing comprising an aluminum alloy lining bonded to a steel backing; said alloy comprising essentially by weight percentage approximately 8% Sn, 4% Si, 2% Pb and the balance aluminum; the Sn having an average particle size less than ten microns and the Si having an average particle size less than 3.5 microns; said method comprising:
   quench casting the aluminum alloy lining by feeding molten alloy into an interface formed between two infernally-cooled rotating metallic rolls so that the alloy is rapidly cooled from a molten state to a solid state in less than one second; said internally-cooled rolls having smooth facing surfaces spaced apart so that the aluminum alloy emerges from the rolls as a continuous solid strip;
   preheating at least one of said aluminum alloy strip and a steel strip; and
   passing the mating strips through a roll assembly wherein the opposed roll surfaces are spaced closer together than the combined thickness of the two strips, such that the aluminum alloy strip is compressed so as to be directly bonded to the steel strip; said roll assembly comprising a roll in contact with the aluminum alloy strip having a diameter substantially smaller than the diameter of the other roll so that, during the rolling operation, the thickness of the aluminum alloy strip is significantly reduced while the thickness of the steel strip remains essentially unchanged.

* * * * *